Aug. 1, 1967  W. KOBER  3,334,254
DYNAMOELECTRIC MACHINE
Filed June 3, 1965  3 Sheets-Sheet 2
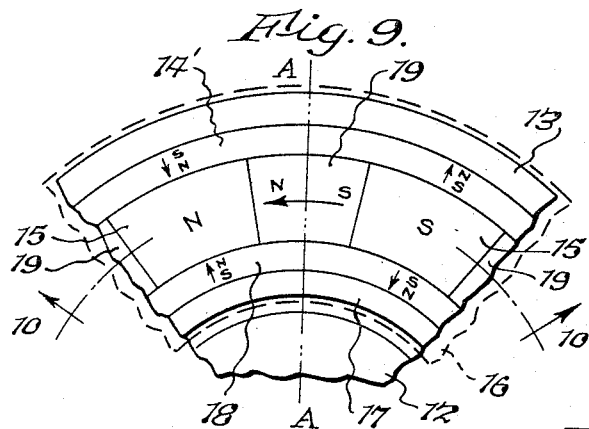
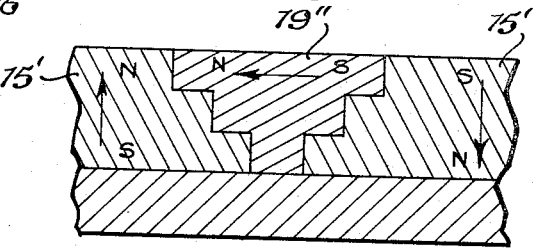
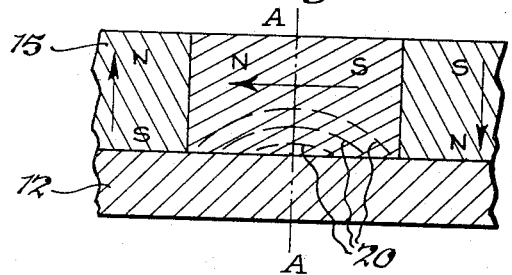
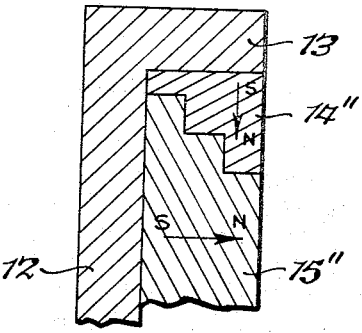
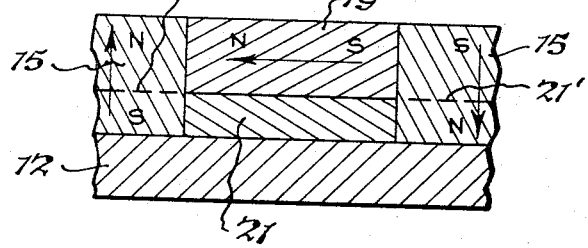
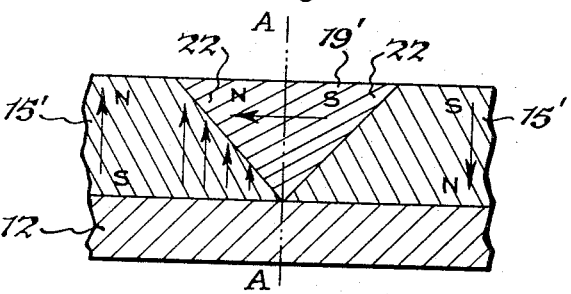
INVENTOR.
William Kober
BY
Christel + Bean
ATTORNEYS.

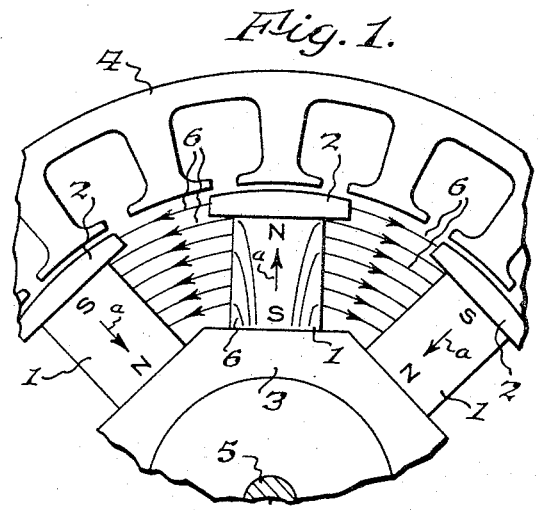

Aug. 1, 1967 W. KOBER 3,334,254
DYNAMOELECTRIC MACHINE
Filed June 3, 1965 3 Sheets-Sheet 3

INVENTOR.
William Kober
BY
Christel + Bean
ATTORNEYS.

United States Patent Office 3,334,254
Patented Aug. 1, 1967

3,334,254
DYNAMOELECTRIC MACHINE
William Kober, Rolling Hills, Calif., assignor to The Garrett Corporation, Los Angeles, Calif.
Filed June 3, 1965, Ser. No. 461,140
12 Claims. (Cl. 310—156)

This invention relates generally to the dynamoelectric art, and more specifically to a new and useful permanent magnet field producing structure for dynamos.

The primary object of this invention is to increase the efficiency of use of permanent magnet material in a field producing structure.

Another object of this invention is to provide more useful cross section of permanent magnet material in a given volume.

Still another object of this invention is to counteract flux losses along what are now in the art considered unavoidable leakage paths.

In one aspect thereof, a field producing structure for dynamoelectric machines constructed in accordance with my invention is characterized by the provision of primary permanent magnet flux producing means magnetized in a direction generally normal to the working surface of the field structure, and secondary permanent magnet flux producing means magnetized and arranged generally crosswise of the primary magnet means in flux additive relation thereto.

In another aspect thereof, a dynamo field producing structure constructed in accordance with my invention is characterized by the provision of permanent magnet flux producing means magnetized and arranged to provide first flux paths toward and away from the working surface of the field structure and second flux paths generally crosswise of the first flux paths in flux additive relation thereto, the second flux paths opposing leakage flux normally associated with the first paths.

The foregoing and other objects, advantages and characterizing features of my invention will become apparent from the ensuing detailed description of various illustrative embodiments thereof, reference being made to the accompanying drawings wherein like reference numerals denote like parts throughout the various views, all of which are generally schematic, and wherein:

FIG. 1 is a fragmentary elevational view of the field producing structure and the armature of a conventional generator of the radial air gap type;

FIG. 2 is a corresponding view showing a radial air gap generator incorporating the instant invention;

FIG. 3 is a fragmentary sectional view of a generator of the axial air gap type incorporating the instant invention, being taken about on line 3—3 of FIG. 4, the armature being indicated in broken lines;

FIG. 4 is a fragmentary end elevational view of the air gap working face of the field producing structure of FIG. 3;

FIG. 5 is a fragmentary end elevational view, on an enlarged scale, showing the field producing structure of a prior art axial air gap generator incorporating a non-magnetic spacer between the outer side of the flux producing magnet ring and the rim of the supporting casing;

FIG. 6 is a fragmentary sectional view thereof, taken about on line 6—6 of FIG. 5;

FIG. 7 is a fragmentary end elevational view corresponding to that of FIG. 5 but showing a modified form incorporating the instant invention;

FIG. 8 is a fragmentary transverse sectional view thereof, taken about on line 8—8 of FIG. 7;

FIG. 9 is an end elevational view corresponding to that of FIG. 7 but showing a further modification incorporating the instant invention;

FIG. 10 is a fragmentary sectional view taken about on line 10—10 of FIG. 9;

FIGS. 11, 12 and 13 are views corresponding to each other and to the view of FIG. 10, but showing further modifications in accordance with the invention;

FIG. 14 is a fragmentary sectional view corresponding to that of FIG. 8 but showing a modified construction incorporating the invention, on an enlarged scale;

Figure 15:
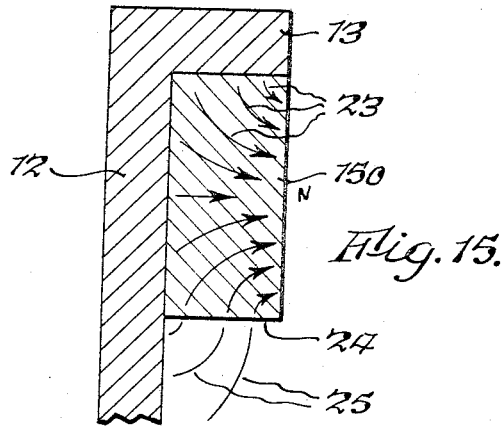
FIG. 15 is a view like FIG. 14, but showing still another form of the invention.

Referring now in detail to the accompanying drawings, there is shown in FIG. 1 a conventional permanent magnet generator of radial or cylidnrical air gap construction. Permanent magnets 1 are magnetized in a radial direction, as indicated by the arrows $a$, to provide alternating poles working across the air gap into the armature 4 from which the usual armature windings have been omitted for greater clarity and ease of illustration. Pole pieces 2 of magnetically permeable material are provided for the usual reason, and a flux return member 3 of magnetically permeable material completes the working magnetic circuit. Magnets 1, poles 2 and return member 3 comprise a rotor mounted in a conventional manner on shaft 5 journaled, by means not shown, for rotation about its lengthwise axis which is normal to the plane of the paper.

As is well known in the art, some of the flux flowing in the base of magnets 1 near flux return member 3 is lost by leakage along arcuate interpole paths, as indicated at 6, and never reaches the stator 4. In fact, the adjacent sides of magnets 1 cannot approach too closely, for if they do, the length of path 6 decreases and the flux loss becomes as great as the increase in magnet section, with the result that the larger magnet does no more than a thinner or smaller magnet. The continuation of leakage lines 6 into the center magnet 1 illustrates that a substantial part of the magnet is wasted in supplying the leakage flux.

It is a particular features of my invention that this conventional leakage flux loss is turned into a gain. This is accomplished, in one form of my invention, by providing magnets in the interpole region, magnetized and oriented to oppose such leakage flux. Thus, in the radial form of FIG. 2, permanent magnet material 9 is placed in the interpole area. The direction of magnetization of magnets 9 is circumferential, as indicated by arrows 6', with the magnets 9 on opposite sides of each magnet 1 being oppositely directed, magnetically speaking, and oriented to oppose the leakage flux normally associated with magnets 1. Now, instead of the flux loss paths 6 of FIG. 1 from magnets 1, there are flux gain paths into and through magnets 1, as indicated at 7. By occupying the interpole space, where leakage occurred, with a properly polarized additional magnet element this area of loss has been turned into an area of gain. The added magnet elements 9 can work directly into pole pieces 2, as well as into the sides of the magnets 1, and can be shouldered to receive the pole piece overhang as shown at 8.

FIGS. 3 and 4 illustrate the invention as applied to a generator of axial air gap construction. The primary permanent magnets 1 are mounted on shaft 5 for rotation about the axis thereof, a flux return plate being positioned against the face of magnets 1 opposite the working, air gap face of the rotor. Magnets 1 are magnetized axially, in the direction of shaft 5, and present alternating poles to armature 4 across an axial air gap. Pole pieces 2 against the air gap ends of magnets 1 define a working face parallel to the air gap working face of armature 4, and the armature can have any conventional winding arrangement. The secondary, interpole magnets 9 extend between adjacent magnets 1, being oriented relative thereto in the same manner as in the radial structure of FIG. 2, and will be appreciated that these parts and their functions are essentially the same as in the radial structure shown in FIG. 2. The cross-magnetized interpole magnets 9 provide working flux paths which oppose the normal interpole leakage flux paths from magnets 1.

In addition, it is a further feature of my invention that the magnetic state of the permanent magnets 1 and 9 can be protected from overload and short circuit armature reaction. This is accomplished by providing a path of very high electrical conductivity looping or encircling the magnets, as shown at 10 and 11 in FIG. 3. Wrought aluminum, magnesium and copper are examples of materials suitable for this purpose, as disclosed in my U.S. Patent 2,719,931. The area occupied by the electrically conductive material 10 has relatively little leakage flux, since the magnetic potential of the sides of magnets 1 rises almost uniformly with distance from the base in contact with return member 3, and the distance between magnet sides remains the same. Thus, the interpole space is shared by the highly electrically conductive material 10 and the magnets 9 so that the assisting cross magnets 9 are in the most useful area for their purpose. The highly electrically conductive material 10, 11 can comprise part of a unitary body, which can be cast in place, and can completely encircle magnets 9 as well as magnets 1. The material at 11 is especially effective in protecting the magnetic state of magnets 1 and 9, while the material at 10 has the added function of mechanically supporting magnets 1 which can be quite brittle. The material 10, 11 therefore also is characterized by a high degree of mechanical strength.

Another type of axial air gap permanent magnet generator, such as shown in my U.S. Patent 3,121,814, is illustrated in FIG. 5. In this construction a ring 15 of magnet material, which may be one piece or in the form of sectors, is axially magnetized in alternate poles as shown. The magnet system can be held in place axially by a thin barrier wall 16 over the working face of the magnet ring 15. The principal part of the centrifugal force caused by high speed rotation is carried by rim 13 which is formed as an integral part of an annular body 12 which acts simultaneously as the principal mechanical structure and as the magnetic flux return circuit. Body 12 and rim 13 comprise a support casing of magnetically permeable material such as steel.

A ring 14 of non-magnetic material can encircle magnet body 15, between it and the magnetic rim 13. Ring 14 adds supporting strength against centrifugal force, but its main function is to act as a non-magnetic spacer between the outer rim of magnet 15 and the steel rim 13, and so minimize magnetic flux leakage loss of the type shown at 6 in FIG. 1.

Barrier wall 16 can be only a thin sheet of non-magnetic material secured to body rim 13. It will protect the face of body 15 against spalling. If made of electrically conductive material, it also functions as a damper.

The principles of this invention can be applied to the structure of FIG. 5, as shown in FIGS. 7 and 8. Here, flux leakage is counteracted by the substitution of a ring of permanent magnet material 14′, magnetized as shown, for non-magnetic body 14. Rim 13, which is formed of magnetic material, now functions as a flux return member for the ring 14′ which is magnetized radially, laterally of magnet body 15, to provide alternate N and S poles oriented to aid the alternate poles of body 15 and oppose the flux leakage therefrom. The action is much the same as described for the interpole material in FIGS. 2 and 3. In FIG. 2, for example, if a plane A—A is placed in the center of the interpole magnet 9, which is the point of magnetic neutrality, half the magnet 9 is working from neutral to N on the right, and half from neutral to S on the left. The construction of FIG. 7 is analagous, and the peripheral area of flux loss is turned into one of gain. The same treatment can be added to the inner diameter by adding a magnetically permeable inner rim 17 to body 12, and another ring of permanent magnetic material 18 between magnet body 15 and flux return ring 17. In this case, magnet rings 14′ and 18 are magnetized and oriented to diametrally oppose each other on opposite sides of magnet body 15, in flux additive relation thereto.

Most permanent magnet materials are oriented, or develop most of their magnetic properties on one axis of orientation. Thus, the material of magnet body 15 would be oriented as shown by the S–N arrows, perpendicular to the plane of the drawing in FIG. 7 and normal to the air gap working surface of the field structure. The material of rings 14′ and 18 would have to be oriented radially, generally parallel to the air gap, as shown by the arrows thereon. However, non-oriented magnet material can be used if cost or availability so indicate. While most non-oriented magnet materials have inferior performance, the saving by the use of the added magnet bodies 14′, 18 is so great that a large benefit to performance would still result.

It is, of course, possible to make the magnet bodies 14′ and 18 out of built-up rectangular or sector shaped parts when this is a favorable way to obtain the necessary orientation in an economical way.

FIG. 9 shows the arrangement of FIGS. 7 and 8 modified by the provision of cross magnet inserts 19 in the interpole region. The interpole magnet bodies 19 are similar in purpose to magnets 9 of FIGS. 2 and 3, and are similarly arranged and oriented. FIG. 9 thus illustrates the arrangement of the invention wherein cross magnet bodies are provided to counteract leakage over the entire perimeter of a primary magnet pole. Between each primary magnet 15 and its surrounding neutral zones, defined by the lines AA of interpole magnets 19 and rings 13 and 17, magnet bodies are present arranged to produce a gain of flux from the vertical surfaces of magnets 15 which will be seen to have the effect of greatly increasing the base area of the entire magnet group working on each primary magnet pole.

The interpole magnets 19 are rectangular in cross section, and extend to contact with support body 12. The leakage flux lines 20 show that interpole magnet body 19 itself will not be working at maximum efficiency, since its inner or bottom face is against permeable body 12. This is avoided, in the arrangement of FIG. 11 where that part of each body 19 which is severely shunted by body 12 is eliminated and replaced by a non-magnetic spacer 21. Spacers 21 can be made of highly electrically conductive material, in which case they closely resemble material 10 of FIG. 3 and may therefore also be an electrically conducting region providing the short-circuited electrical conductor turn or slugging required to prevent loss of magnetization on short circuit. In like manner, an annular spacer of non-magnetic material can be inserted between each cross magnet ring 14′, 18 and body 12, as indicated at 21′ in FIG. 11. When made of highly electrically conductive material, spacers 21′ together with spacers 21 complete electrically conductive loops encircling magnets 15. Where desired, these loops can be electrically joined to conductive material extending across the air gap surface of magnets 14′, 15 and 19.

FIG. 12 shows a most efficient way of utilizing all the advantages of the principles of the invention and all the interpole space, for situations where slugging is not required. Here adjacent primary magnets 15′ have diverging sides, and interpole magnets 19′ have a triangular cross-section complementing and interfitting with magnets 15′. At the center line of magnets 19′ the main pole magnets 15′ touch, but since they have no magnetic potential at this starting point, no loss is involved. Similarly, magnets 19′ touch flux return body 12 but they have no magnet length at that line of contact and no loss is entailed. Magnets 19′ work off the neutral plane to develop flux left and right, toward the working area, and alternate magnets 15′ work off the neutral potential surface of body 12 to develop flux upward toward the working area of the upper pole face.

The plane of contact 22 between magnets 19′ and 15′ is inclined at about 45°. However, this can vary and calculation of the respective working points of the material in 19′ and in the adjacent area of magnets 15′ is required to determine the angle required for optimum performance. Also, the optimum zone of contact generally will be a curve rather than a flat plane. It may be advisable to choose different magnetic materials for bodies 15′ then for bodies 19′, and the slope of the contact zone then may deviate substantially from 45°.

The triangular shape of magnets 19 poses a problem in retaining the magnets in place. A cover plate 16, such as shown in FIGS. 5 and 6 can be used to accomplish this. Another way of getting the result of FIG. 12 with no substantial magnetic loss and with some gain in mechanical strength is shown in FIG. 13, where the contact zone 22 of FIG. 12 is replaced by one or more steps. Magnet 19″ now acts as a sound mechanical spacer between adjacent magnets 15′. It is also becomes safer to mount by cementing to bodies 15′.

This same plan can be used with the magnet rings 14′, 18 of FIGS. 7 and 8, as shown in FIG. 14. The step system is particularly advantageous here, as the body 14″ can bear the centrifugal load of rotation between supporting rim 13 and body 15″ without tending to wedge out. The magnetic advantage is exactly that described for FIGS. 12 and 13 over FIG. 10.

As previously noted, in all these applications it is often advisable to choose a different magnetic material for bodies 9, 14′, 19, 19′ and 19″ than for bodies 1, 15, 15′ and 15″. Some permanent magnet materials, notably ceramics, have a permeability near unity and a high coercive force. The low permeability permits the gains of the invention with practically no increase in the permeability of the pole to armature reaction flux. The high coercive force permits a relatively short interpole space which in turn permits expansion of the pole span of the main pole 1, 15, 15′ or 15″ while still having a gain rather than a loss in the interpole faces.

If both the main pole 1, 15, 15′ and 15″ and the added bodies 9, 14′, 19, 19′ and 19″ are oriented, it is necessary to obtain the desired shape with the proper orientation, and to magnetize with a field that will produce substantial saturation in the desired directions. The added bodies may in some cases be magnetized externally before adding to the structure, if the material permits. In this case, the main poles may be magnetized before adding the bodies or the added bodies can be subjected to any non-damaging system for magnetizing the main poles with all parts in place.

FIGS. 15–19 illustrate another general system embodying the invention. This is for a structure like that of FIGS. 7 and 8 but using a non-oriented magnet material. In FIG. 15, such material is shown at 150. The magnetization must be such as to develop flux lines in the material both along the primary, working path and along and in opposition to the leakage paths, as shown at 23. The logic is similar to that given above for the composite magnet materials. The central portion of each pole is magnetized generally normal to the air gap working surface, in the manner of magnets 1, 15, 15′ and 15″, while the surrounding portions of each pole are cross magnetized on a curve toward and away from the working surface, as shown at 23, opposing the usual flux leakage paths in the manner of magnets 9, 14′, 18, 19, 19′ and 19″.

Figure 16:
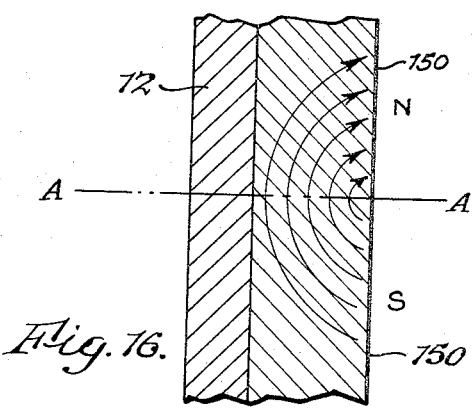
FIG. 16 is a sectional view like those of FIGS. 10–13, but illustrating the form of the invention shown in FIG. 15.

FIG. 16 shows the flux in the interpole regions, which is substantially the same about the neutral plane A—A as to both the permeable body 12 and rim 13. On the inner magnet rim 24, no permeable mating material is shown, but the flux lines are oriented in susbtantially the same way as if there were, with a partial benefit resulting from a greatly reduced leakage into the air, as shown at 25, because the potential at 24 is reduced by the off-directed lines of flux flow which have a component toward the working pole area and away from the rim 24.

Figure 17:
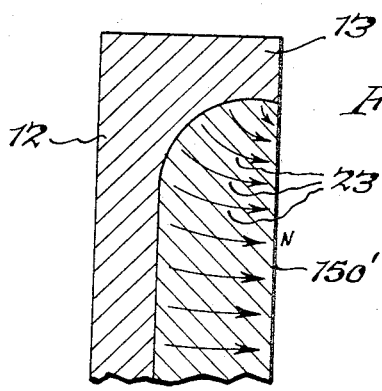
FIG. 17 is a view like that of FIG. 15, but showing a modification.

FIG. 17 shows an improvement in use of magnet material by eliminating the deep corner in FIG. 15 where rim 13 meets back 12. This is a region where the magnet must work inefficiently, and the curved outer rim of magnet 150′ uses less magnet material for essentially equal performance. The inner side of rim 13 has a slight reverse curve for mechanically securing the magnet 150 to keep it from falling axially outward, to the right in FIG. 17.

Figure 18:
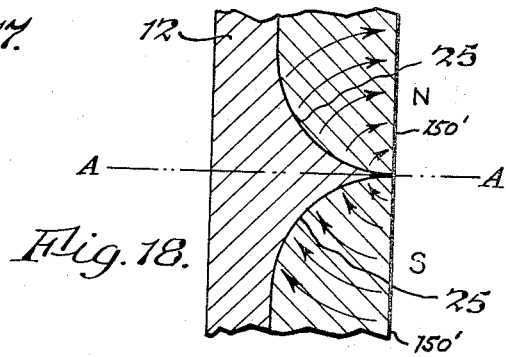
FIG. 18 is a view like that of FIG. 16, but showing the modification of FIG. 17.

FIG. 18 shows a similar treatment of the interpole area by adding to or projecting permeable body 12 into the interpole area. The opposite sides 25 of the interpole projection are curved, in a manner similar to rim 13 of FIG. 17. The inner rim of the magnet body 150 may also be so treated, by providing an inner permeable rim corresponding to rim 17 of FIGS. 7 and 8 but with a curved inner wall corresponding to that of rim 13 in FIG. 17.

Figure 19:
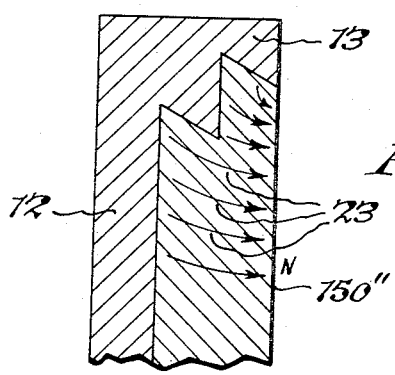
FIG. 19 is a view like those of FIGS. 15 and 17, but showing still another modification of the invention.

The construction of FIG. 19 uses steps instead of a smooth curve on the rim 13 and the magnet 150″. The object is similar to that described for magnet ring 14″ in FIG. 14, obtaining a step compromise for the ideal curve of FIG. 17. At a slight sacrifice of magnetic performance there is a gain of mechanical greater strength in the rim 13, greater security of grip, and reduced bearing pressures on the magnet 150″ due to centrifugal force. The circumferential areas of the steps are shown slanted backward for security in axially retaining the magnet, particularly when the unit is running. Any desired number of steps can be used, with more steps giving a better magnetic approximation but increasing the cost.

While the representation of armature 4 has been omitted from most figures of the drawing, it will be appreciated that each of the illustrated field structures is intended to face an armature across an air gap, as indicated in FIG. 3. Also, it will be appreciated that the various illustrated field structures are annular and generally symmetrical about the axis of rotation, and are intended to be mounted on shaft 5 for rotation therewith as shown in my aforesaid Patents 2,719,931 and 3,121,814. Of course, if desired the armature could rotate relative to the field structure.

Accordingly, it is seen that my invention fully accomplishes its intended objects. While I have disclosed and described in detail only certain embodiments of my invention, that has been done by way of illustration without throught of limitation.

I claim:

1. A dynamo field producing structure having an air gap working surface and comprising permanent magnet flux producing means magnetized and arranged to provide first flux paths generally normal to said working surface and second flux paths generally crosswise of said first flux paths in flux additive relation thereto, said second flux paths opposing the leakage flux paths normally associated with said first flux paths.

2. A dynamo field producing structure having an air gap working surface and comprising primary permanent magnet flux producing means magnetized in a direction generally normal to said working surface, and secondary permanent magnet flux producing means magnetized and arranged generally crosswise of said primary magnet means in flux additive relation thereto.

3. A field producing structure as in claim 2, wherein said secondary magnet means are arranged in the interpole region between adjacent ones of said primary magnet means.

4. A field producing structure as in claim 2, wherein said secondary magnet means substantially completely encircle said primary magnet means for at least a portion of the length thereof.

5. A field producing structure as in claim 3, together with highly electrically conductive material encircling said primary and secondary magnet means.

6. A field producing structure for a dynamoelectric machine of the axial air gap type having a rotor mounted for rotation about an axis of rotor rotation, said field producing structure comprising first and second permanent magnet flux producing means arranged in generally concentric relation about the axis of rotation, third permanent magnet flux producing means arranged between said first and second magnet means, said third magnet means having generally axially directed poles, and fourth permanent magnet flux producing means arranged in the interpole area between said poles, said first, second and fourth magnet means being arranged to oppose leakage flux from said third magnet means.

7. A field producing structure for a dynamo having an axis of rotor rotation, said field producing structure comprising permanent magnet flux producing means magnetized to provide alternate axially directed north and south poles around said axis and cross magnetized flux producing interpole areas aiding said axially directed poles.

8. A field producing structure for a dynamoelectric machine of the axial air gap type having a rotor mounted for rotation about an axis of rotation, said field producing structure comprising a first annular structure of permanent magnet material, a second annular structure of permanent magnet material encircling said first structure in magnetic connection therewith and having axially directed north and south poles alternating around said axis, a third annular structure of permanent magnet material encircling said second structure in magnetic connection therewith, said first and third structures having generally radially directed north and south poles alternating around said axis and oriented to oppose leakage flux paths of said second structure.

9. In a dynamoelectric machine of the axial air gap type having an axis of rotor rotation, a field producing structure having an air gap working surface and comprising first and second permanent magnet flux producing means arranged in generally concentric relation about said axis of rotation, third permanent magnet flux producing means arranged between said first and second magnet means, said third magnet means having generally axially directed poles alternating around said axis, and fourth permanent magnet flux producing means between said third magnet poles, said first and second magnet means having generally radially directed poles and said fourth magnet means having generally circumferentially directed poles all arranged to oppose leakage flux from said third magnet poles, magnetic flux return means magnetically connected to said third magnet means at the end thereof opposite said working surface, and non-magnetic spaced means between said flux return means and said first, second and fourth magnet means.

10. A field producing structure as set forth in claim 9, wherein said non-magnetic spacer means comprise highly electrically conductive material encircling said third magnet poles.

11. A dynamo field producing structure having an air gap working surface and comprising primary permanent magnet flux producing means magnetized in a direction toward and away from said working surface, and secondary permanent magnet flux producing means magnetized and arranged generally crosswise of said primary magnet means in flux additive relation thereto, said secondary magnet means abutting said primary magnet means, the interface between said primary and secondary magnet means being of stepped formation.

12. In a dynamoelectric machine of the axial air gap type, a rotary field producing structure comprising a shaft journaled for rotation about the axis thereof, annular permanent magnet means generally concentric with said axis, said magnet means having axially directed poles, an annular casing receiving and supporting said magnet means, said casing comprising an outer annular side wall generally concentric with said axis encircling the outer peripheral side of said magnet means for supporting the same against centrifugal force and an annular end wall extending across one end face of said magnet means from said side wall, the juncture between said one end face and said outer peripheral side of said magnet means being convexly curved and said casing being correspondingly curved in substantial conformance thereto.

No references cited.

MILTON O. HIRSHFIELD, *Primary Examiner.*

L. L. SMITH, *Assistant Examiner.*